United States Patent
Yan et al.

(10) Patent No.: US 7,936,990 B2
(45) Date of Patent: May 3, 2011

(54) METHOD AND NODE APPARATUS FOR TRAFFIC PROTECTION IN OPTICAL TRANSPORT NETWORK

(75) Inventors: Jun Yan, Shenzhen (CN); Yanming Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1005 days.

(21) Appl. No.: 11/568,310

(22) PCT Filed: Sep. 5, 2005

(86) PCT No.: PCT/CN2005/001406
§ 371 (c)(1),
(2), (4) Date: Apr. 25, 2007

(87) PCT Pub. No.: WO2006/026914
PCT Pub. Date: Mar. 16, 2006

(65) Prior Publication Data
US 2007/0292129 A1    Dec. 20, 2007

(30) Foreign Application Priority Data

Sep. 4, 2004 (CN) .......................... 2004 1 0079046

(51) Int. Cl.
G02F 1/00 (2006.01)
H04B 10/08 (2006.01)
(52) U.S. Cl. ..................... 398/5; 398/4; 398/12; 398/19
(58) Field of Classification Search .................. 398/3, 4, 398/5, 12, 19, 2, 7
See application file for complete search history.

(56) References Cited

U.S. PATENT DOCUMENTS

2003/0170020 A1 * 9/2003 Chaudhuri et al. ............... 398/5

FOREIGN PATENT DOCUMENTS

| CN | 1275006 | 11/2000 |
|---|---|---|
| CN | 1416234 | 5/2003 |
| CN | 1479455 | 3/2004 |
| EP | 1 056 235 | 11/2000 |

(Continued)

OTHER PUBLICATIONS

European Search for Application No. 05 783 972.2-2415, dated Oct. 5, 2007.

(Continued)

*Primary Examiner* — M. R. Sedighian
(74) *Attorney, Agent, or Firm* — Marshall, Gerstein & Borun LLP

(57) ABSTRACT

Disclosed is a method and node apparatus for traffic protection of Optical Transport Network (OTN), including: setting a part of channels in one fiber as working channels used for carrying traffic in need of protection, and setting a part of channels in the other fiber with a reverse transmission direction as protection channels, the number of which is equal to that of the working channels, to form a one-to-one protection for the working channels; when a failure in an optical line of OTN is detected, determining a bridging node and a switching node in accordance with pre-designated protection strategy, bridging and switching the traffic to be transmitted through the failed optical line between the working channels and the protection channels at the determined bridging node and switching node. This invention can realize OTN protection based on two-Fiber OMS shared protection ring, and improve the transmission reliability of optical networks.

13 Claims, 4 Drawing Sheets

FOREIGN PATENT DOCUMENTS

| | | | |
|---|---|---|---|
| EP | 1 411 665 A | | 4/2004 |
| EP | 1411665 | * | 4/2004 |

OTHER PUBLICATIONS

International Preliminary Report on Patentability for International Application No. PCT/CN2005/001406, dated Mar. 6, 2007.

International Search Report for International Application No. PCT/CN2005/001406, dated Dec. 8, 2005.

Written Opinion for International Application No. PCT/CN2005/001406, dated Dec. 8, 2005.

* cited by examiner

METHOD AND NODE APPARATUS FOR TRAFFIC PROTECTION IN OPTICAL TRANSPORT NETWORK

CROSS REFERENCES TO RELATED APPLICATIONS

This application is the national phase of International Application No. PCT/CN2005/001406, which was filed on Sep. 5, 2005, and which, in turn, claimed the benefit of Chinese Patent Application No. 200410079046.3, which was filed on Sep. 4, 2004, the entire disclosures of which are hereby incorporated by reference.

FIELD OF THE INVENTION

The present invention generally relates to the technical field of Optical Transport Network (OTN), and more particularly, to a method and node apparatus for traffic protection in OTN based on two-fiber Optical Multiplex Section (OMS) shared protection ring architecture.

BACKGROUND OF THE INVENTION

With the development of optical network communication techniques, the method of using optical fibers to transmit signals has become a mainstream of network traffic transmission. During the transmission process of optical networks, instances affecting traffic transmission, such as a fiber break and a node failure, may possibly take place at any moment. In order to improve the reliability of traffic transmission, and raise the usability of optical networks, protective measures aiming at possible situations which may affect traffic transmission are required in the OTN. The protective measures are generally set as adopting certain backup resources to protect active resources, and when any abnormality arises to the active resources, traffic transmission will be taken over by the backup resources.

At present, a protection scheme of two-fiber MS shared protection ring is adopted in the Synchronous Digital Hierarchy (SDH) field to realize traffic protection. The detailed implementation is adopting two fibers, whose transmission directions are opposite, For N time slots of each fiber of the MS, the former half of the time slots (1 to N/2) in one fiber are regarded as working time slots, and the latter half of the time slots (N/2+1 to N) in the other fiber are regarded as protection time slots of the corresponding working time slots. When a failure such as a fiber breaking occurs, K1 byte and K2 byte are employed to deliver protection switching information between different nodes. Then, bridging and switching are implemented at both end nodes of the broken fiber.

The prior art has the following characteristics:

It is only acceptable for SDH field. Only a latter half of channels in one fiber are allocated as protection channels to protect working channels of a former half of channels in the other fiber. The number of nodes permitted for this kind of protection ring is at most 16. Further, the traffic is bridged at both the end nodes of the failure, which will bring unendurable delay for transoceanic applications.

Similarly, a protection scheme based on bidirectional optical line shared protection ring is adopted in technical field of Wavelength Division Multiplexing (WDM).

Referring to FIG. 1, at least two fibers X and Y are needed between two adjacent nodes in this method. One half of wavelengths in each fiber are set to carry working signal S, and the other half are set to carry protection signal P. That is, the fiber X simultaneously transmits signal of working wavelength S1 in working section W, and signal of protection wavelength P2 in protection section P; the fiber Y simultaneously transmits signal of working wavelength S2 in working section W, and signal of protection wavelength P1 in protection section P. The working wavelength S1 of one fiber is protected by the protection wavelength P1 of the other fiber in opposite direction of the ring, and vice versa. Also, bidirectional transmission of working traffic is permitted in this method.

When the two fibers between node A and node B are cut off, referring to FIG. 2, node A and node B adjacent to the broken point may find the failure via detecting optical powers. Then, node A and node B will locally control optical switching to connect the S1/P2 fiber and the S2/P1 fiber, and thereby transmit signals from the working wavelengths of the S1/P2 fiber and the S2/P1 fiber to the protection wavelengths of the other fiber to complete protection switching.

It could be seen from the above that, path of the optical signal will become longer after switching, and thus circumference of the ring circuit may be limited. Moreover, optical power is used as the switching initiating criteria in this method. so that line performance monitoring is insufficient, i.e., signal quality detection aiming at the optical line may not be fully carried out to determine SF/SD conditions, which lead to the unreliability of protection switching. Therefore, this method only accommodates the WDM field.

SUMMARY

In view of the above, the present invention is to provide a method and a node apparatus for traffic protection of OTN, in order to realize OTN protection based on two-fiber OMS shared protection ring, and improve the transmission reliability of optical networks.

A method for traffic protection of Optical Transport Network (OTN), of which nodes are connected through at least two fibers in opposite transmission directions to form a ring topology, includes the steps of:

A. setting a part of channels in one fiber as working channels for carrying traffic in need of protection, and setting a part of channels in the other fiber with a reverse transmission direction as protection channels, the number of which is equal to that of the working channels, to form a one-to-one protection for the working channels;

B. when a failure in an optical line of OTN is detected, determining a bridging node and a switching node in accordance with pre-designated protection strategy, bridging and switching the traffic to be transmitted through the failed optical line between the working channels and the protection channels at the determined bridging node and switching node.

A node apparatus in an OTN, including:

at least one wavelength-division multiplexing unit configured to output optical signals received from line side of the OTN to an OTN line unit after de-multiplexing processing, and output optical signals received from an OTN line unit to line side of the OTN after multiplexing processing;

at least one OTN line unit configured to transform optical signals received from the wavelength-division multiplexing unit to ODUk signals and output the ODUk signals to an ODU cross-connection unit, or transform ODUk signals received from an ODU cross-connection unit to optical signals and output the optical signals to the wavelength-division multiplexing unit;

an ODU cross-connection unit configured to implement ODUk granularity cross-connection function;

when bridging is needed, the ODU cross-connection unit cross-connects the ODUk signals received from the working channels to corresponding protection channels; and when switching is executed, the ODU cross-connection unit cross-connects the ODUk signals received from the protection channels to corresponding working channels.

It could be seen from the above-provided solution that the present invention has the following advantages:

The present invention has greatly simplified the configuration of network protection. Wavelength-division multiplexing in the present invention is degenerated to line multiplexing and transmission technique, and the wavelength-division multiplexing of every station is isolated from one another, which is of benefit to reducing the total number of the occupied color wavelengths of the whole network, reducing kinds of OTN line units, and finally saving the cost of network constitution.

Since each station has given a re-amplifying, re-shaping and re-timing (3R) operation to the optical signal, harmful effects such as Optical Signal Noise Ratio (OSNR) degradation and nonlinearity of long-haul transmission will be eliminated.

With regard to ultra long-haul transmission, bridging and switching are implemented for traffic at the source node and the destination node to acquire the most optimal protection path, which may effectively avoid the traffic from passing through redundant distance.

Comparing with switching process in the optical layer, the switching in the electrical layer is more reliable.

Through defining Automatic Protection Switching (APS) overhead signals in the Optical Multiplex Section (OMS), switching requests are subdivided, and the number of nodes supported by the ring is increased to at most 256.

EMBODIMENTS OF THE INVENTION

The present invention is applied to the OTN containing a structure similar to two-fiber OMS shared protection ring, i.e., nodes in the OTN are connected through at least two fibers which transmit traffic in opposite directions, and form a ring topology.

Figure 3:
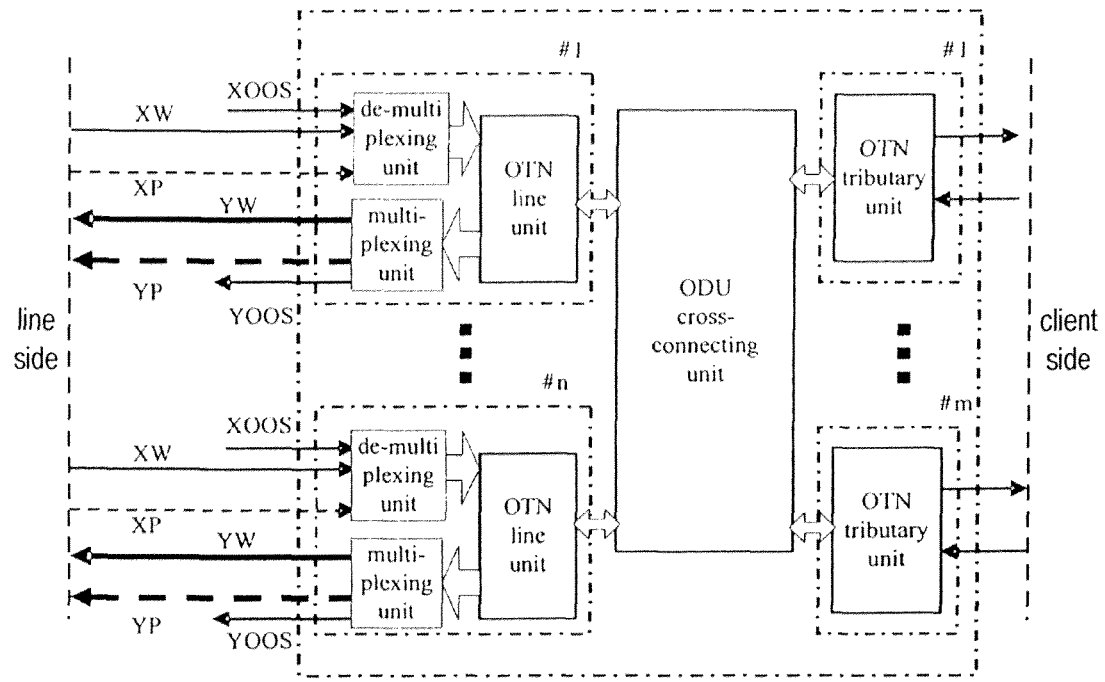
FIG. 3 is a schematic diagram illustrating the structure of node apparatus according to an embodiment of the present invention.

The detailed construction of node apparatus of the present invention adopted in the OTN is shown in FIG. 3, which includes: wavelength-division multiplexing unit, Optical Channel Data Unit (ODU) cross-connection unit and optical signal interface unit.

The wavelength-division multiplexing unit functions to implement wavelength-division multiplexing processing for optical signals. This unit can be further divided into de-multiplexing unit and multiplexing unit.

The de-multiplexing unit performs Optical Transmission Section (OTS) trail termination sink function, OTS to Optical Multiplex Section (OMS) adaptation sink function, OMS trail termination sink function, and OMS to Optical Channel (OCh) adaptation sink function. The optical signals received from the line side are split into multiple channels according to their wavelengths, and sent to corresponding OTN line units for processing.

The multiplexing unit performs OCh to OMS adaptation source function, OMS trail termination source function, OMS to OTS adaptation source function, and OTS trail termination source function. That is, the multiplexing unit combines signals of multiple channels with different wavelengths received from the OTN line unit into one-channel signals, and outputs the one-channel signals to the line side.

Here, the line side generally refers to the part outside the wavelength-division multiplexing unit.

The ODU cross-connection unit implements ODUk Cross-Connection Function, realizes ODUk granularity cross-connection function, dynamically connects signals for multiple wavelength-division line interfaces and/or tributary interfaces (that is, connects signals between a first line interface and a second line interface, or between a first tributary interface and a second tributary interface, or between a line interface and a tributary interface), and accomplishes bridging and switching under the control of protocols.

The optical signal interface unit respectively provides connection between the wavelength-division multiplexing unit and the ODU cross-connection unit, and between the ODU cross-connection unit and the client side, and performs signal transform processing. The optical signal interface unit further includes OTN line unit and OTN tributary unit.

Here, the OTN line unit accomplishes OTU to ODU adaptation source function, OTU trail termination source function, OCh to OTU adaptation source function, and OCh trail termination source function; OTU to ODU adaptation sink function, OTU trail termination sink function, OCh to OTU adaptation sink function, and OCH trail termination sink function. Moreover, the OTN line unit may transform and ODU signals received from the ODU cross-connection unit to optical signals conforming to G.692, and output the optical signals to the multiplexing unit; or transform the optical signals conforming to G.692, which is received from the multiplexing unit, to ODU signals, and output the ODU signals to the ODU cross-connection unit.

The OTN tributary unit is configured to implement client signals to Optical Channel Payload Unit (OPU) adaptation source function, OPU trail termination source function, OPU to ODU adaptation source function, and ODU trail termination source function; client signals to OPU adaptation sink function, OPU trail termination sink function, OPU to ODU adaptation sink function, and ODU trail termination sink function. Moreover, the OTN tributary unit may transform the client side traffic signals inputted from the client side to ODU signals outputted by the line side, and transmit the ODU signals to the ODU cross-connection unit; or transform the ODU signals from the ODU cross-connection unit to client side signals, and output the client side signals. Here, the client side generally refers to the part outside the OTN tributary unit.

Figure 5:
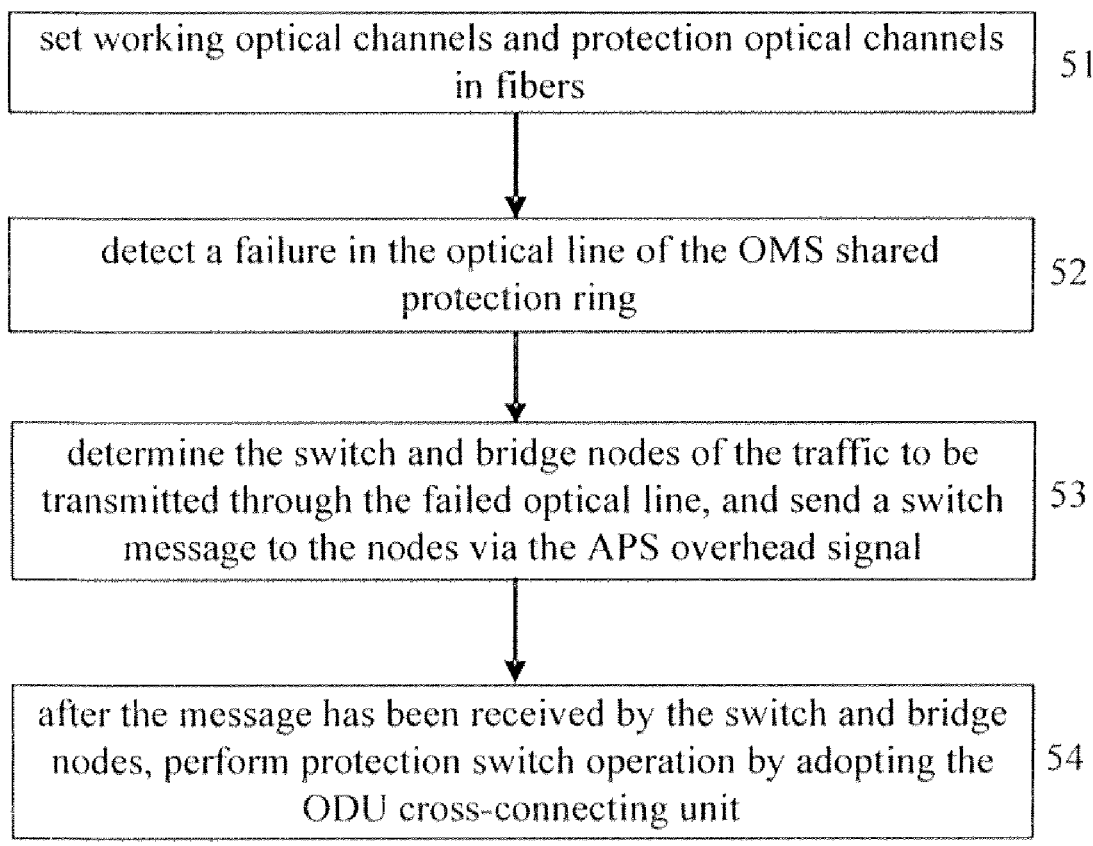
FIG. 5 is a flowchart illustrating procedure of an embodiment of the present invention.

Referring to FIG. 5, the method for traffic protection of OTN in an embodiment of the present invention includes the steps of:

Step 51: Set working channels and protection channels for a two-fiber OMS protection ring.

Here, the channels can be wavelengths or ODUs, and the step concretely includes: according to traffic demand, choose a portion of wavelengths as working wavelengths from each fiber of the two-fiber OMS protection ring, and use the working wavelengths to carry traffic when the fibers are in the normal working state. In addition, set as many wavelengths as the working wavelengths to be protection wavelengths, and the protection wavelengths in one fiber are used to protect the working wavelengths in the other fiber. When one fiber fails, the traffic carried in the working wavelengths of the fiber can be switched to the protection wavelengths of the other valid fiber. Alternatively, set apart of ODUs in each fiber as working ODUs to carry traffic when the fibers work normally, and set a same number of ODUs as protection ODUs. The working ODUs in one fiber are protected by the protection ODUs in the other fiber, and when one fiber fails, the traffic in the working ODUs of the fiber can be switched to the protection ODUs of the other valid fiber. Other wavelengths, which are neither set as working wavelengths, nor as protection wavelengths, can be used to transfer none protection traffic without being preempted by other traffic. It is obvious that the number of working wavelengths can at most occupy half of the whole wavelength of the fiber.

The two setting procedures of the present embodiment are the same, and an example of setting working wavelengths and protection wavelengths in fibers will be described hereinafter.

When conducting protection switching, if an approach of bridging and switching at two end nodes of a breaking is adopted, the switching granularity can be the sum of the capacity of multiple channels, and setting can be flexibly adjusted by using single wavelength capacity as a unit. For the instance of ultra long-haul transmission, an approach of bridging and switching at both the source node and the destination node of the traffic can be used, and the switching granularity is the capacity of single channel, which hereby refers to one ODU or one wavelength.

Referring to FIG. 3, in the present embodiment, traffic on those two fibers of the two-fiber OMS shared protection ring is transmitted in opposite directions. It is assumed that the number of optical wavelengths in each fiber is N, i.e., there are totally N optical wavelengths in each fiber for carrying and transmitting optical signals. In the FIG. 3, one fiber X is represented by two thin lines with arrows, and the other fiber Y is denoted by two thick lines with arrows. Moreover, the solid lines stand for working wavelengths, and the dashed lines stand for protection wavelengths in the fibers. For the convenience of the following description, each part of the wavelengths in the fibers is nominated as follows: the working wavelengths of fiber X are named as XW, the protection wavelengths of fiber X are named as XP; and the working wavelengths of fiber Y are named as YW, the protection wavelengths of fiber Y are named as YP. Here, the YP is used for protecting the XW, while the XP is used for protecting the YW.

Normally, bidirectional traffic is born separately in a working channel of the two fibers, i.e., each direction of the traffic to be transmitted is carried by one of the working wavelengths XW and YW of the two fibers. Moreover, the protection channels of the two fibers, i.e., the protection wavelengths XP and YP, can be used for transferring extra traffic in the OTN. The total capacity of the traffic under protection equals to the sum of total wavelength capacities.

Step 52: When the optical line in the OTN fails to implement traffic transmission, both the end nodes of the failed optical line will learn the occurrence of the failure through detecting the signal quality.

In this step, each node in the OTN may detect quality of the optical signals passing though the node itself. When the quality of the optical signal changes and the protection switching condition is satisfied, the node decides that there is a failure in the optical line. Otherwise, the optical line is considered as normal. The detailed processing is: the de-multiplexing unit illustrated in FIG. 3 tests optical powers of four groups of multi-wavelength signals XW, XP, YW and YP, and determines whether a fiber protection switching condition is satisfied in response to detection results of the optical power.

In this embodiment, protection switching conditions can be divided into Signal Degrade (SD) and Signal Fail (SF), which are determined with reference to the following indications: the Signal Loss (LOS), the Forward Defect Indication Payload (OMSn-FDI-P), the Forward Defect Indication Overhead (OMSn-FDI-O), the Payload Mismatch (OMSn-PLM), the Optical Power Low (OMSn-PowerLow), the Optical Power Difference Over, the Accumulative Errors of OTU SM BIP of multiple working channels Over, and the Accumulative Errors of OTU SM BIP of multiple working channels Degrade. According to practical demand, when the above described one or more indications are received by a node, the node is triggered to carry out protection switching.

Here, the meanings of every indication will be introduced in sequence.

The Signal Loss (LOS) indicates that no optical signal is inputted. This indication is regarded as an SF condition.

The Forward Defect indication Payload (OMSn-FDI-P) is set to transfer the defect detected by the upstream to the downstream. When a defect exists in the OTS, the OMSn-FDI-P is generated at OTS/OMS adaptation sources and transferred to the downstream as an SF condition.

The Forward Defect Indication Overhead (OMSn-FDI-O) is set to transfer the defect detected by the upstream to the downstream. When an OTM Overhead signal (OOS) transmitted in the Optical Supervisory Channel (OSC) is lost, the OMSn-FDI-O is generated and transferred to the downstream as an SF condition.

The Payload Mismatch (OMSn-PLM) is set to transfer the defect detected by the upstream to the downstream. When there is no payload signal, the OMSn-PLM is generated at OTS/OMS adaptation sources and transferred to the downstream as an SF condition.

The Transmission Performance Indicator (optional) is a guideline of the transmission performance of OMS, in view of the accumulative calculation result of Section Monitoring (SM) Bit-interleaved Parity with 8-bit Errors (BIP-8) in the Optical Channel Transport Unit (OTUk) Overhead (OH) of multiple working channels. Further, an OVER Alarm of BIP-8 is used as an SF condition, and an SD Alarm of BIP-8 is used as an SD condition.

The Optical Power Low (OMSn-PowerLow) indicates that the optical power is lower than the preset threshold. When the optical power is lower than the threshold set in advance, the Optical Power Low signal is used as an SF condition.

The Optical Power Difference Over, which is regarded as an SD condition, is generated when the absolute value of the difference between optical powers of the working wavelengths and the protection wavelengths is larger than the threshold set in advance.

The Accumulative Errors of OTU SM BIP of multiple working channels Over or Degrade, which is regarded as an SF or SD condition, is generated when the OTU SM BIP exceeds the threshold set in advance or degrades.

Generally, a failure in an optical line refers to a scenario that all channels in a fiber fail. Here, the failure can be a fiber break or a node failure.

In addition, the present embodiment also provides a setting interface and a query interface for the optical power threshold and the optical power difference threshold, which could be used to set and inquire about these two thresholds. Besides, the optical power threshold and the optical power difference threshold can also be set flexibly. For example, an optical power threshold of uni-wavelength is set at first, and automatically transformed to an optical power threshold of multi-wavelength inside the system; or an optical power threshold of multi-wavelength is set directly.

Step 53: Determine bridging node and switching node.

In general, the bridging node and the switching node may be two end nodes of a failure. For OMS shared protection ring of ultra long-haul application, the bridging node and the switching node may be the source node and the destination node of the traffic to be transmitted through the failed optical line.

In the case when two end nodes of a failure are used as bridging node and switching node, all working channels should implement switching, i.e., the switching granularity is the sum of the capacities of all the working channels; while in the case when the source node and the destination node of the traffic are used as bridging node and switching node, only working channels of the corresponding traffic need to be switched, namely the switching granularity is the capacity of single working channel.

If the bridging node and the switching node are the source node and the destination node of traffic, all the traffics needing to be transmitted by the failed optical line, together with their source nodes and destination nodes, can be determined through inquiring traffic relation tables of nodes. Here, the traffic relation table is saved on a node, and used for recording the source node, the destination node and channels of traffic.

Step 54: The two end nodes of the failure inform the determined bridging node and switching node through sending a failure message, and the bridging node and the switching node separately implement bridging and switching according to the received failure message. Here, the failure message is a switching request message carried by an APS overhead signal.

The detailed procedure of bridging and switching is: transferring the normal traffic transmitted to the direction of failed span from the working wavelengths of one fiber to the protection wavelengths of the other fiber by the bridging node. The bridged traffic will be reversely transmitted to the determined switching node in the protection channels, and at the switching node, the traffic in the protection channels will be switched back to the working channels, i.e., the traffic is switched from the protection wavelengths of one fiber to the working wavelengths of the other fiber, and dropped from the ring on the working wavelengths. Practically, the traffic may also be directly dropped from the ring on the protection wavelengths according to the demand. If the destination node needs to drop the traffic from the ring using channels identical with that of the source node, the traffic may be switched from the protection wavelengths of one fiber to the working wavelengths of the other fiber, and dropped from the ring on the working wavelengths.

In practical applications, protection switching of the nodes in the shared protection ring includes: issuing protection switching commands from network management unit, and detecting switching conditions in harmony with the SD/SFs.

The protection switching commands in the present invention include: Clear, Working Channel Lock, Forced Switching-Channel, Signal Fail, Signal Degrade, Manual Switching-Channel, Exerciser, Wait-To-Restore, and No Request.

In this step bridging and switching of nodes are implemented by the ODU cross-connection unit. After implementing ODUk granularity cross-connection function, the ODU cross-connection unit can output all the ODUks contained in any wavelength of any inputting fiber to any wavelength of any other fiber according to the requirements. If the channel is an ODUk, after implementing ODUk granularity cross-connection function, the ODU cross-connection unit can output any ODUk of any inputting fiber to any ODUk of any other fiber according to demand.

In the present embodiment, both the working wavelengths and the protection wavelengths of a fiber use a same OMS Overhead Signal. For example, the XW and the XP share one set of OMS OH XOOS (Overhead of fiber X), the YW and the YP share one set of OMS OH YOOS (Overhead of fiber Y), and these wavelengths are respectively transmitted through an OSC which is independent of each traffic transmission wavelength. Here, the Overhead Signal is defined as 6 bytes.

The switching request involved in step 54 is defined as 4 bytes, and meanings of every byte are shown in Table 1.

TABLE 1

| 1 | 2 |
|---|---|
| 1 2 3 4 5 6 7 8 | 1 2 3 4 5 6 7 8 |
| Request/State | Source Node ID |
| 3 | 4 |
| 1 2 3 4 5 6 7 8 | 1 2 3 4 5 6 7 8 |
| Dest Node ID | Long/Short Path | State | Check Bits |

In Table 1 the Source Node ID and the Destination Node ID are respectively denoted by one byte, and value range of these two IDs is 0-255. Therefore, the ring of this embodiment can support at most 256 nodes. The Long/Short Path in the fourth byte is expressed by one bit, where 0 stands for Short Path and 1 stands for Long Path. 4 bits of the fourth byte are parity bits, which are calculated according to the first 3 bytes and the first 4 bits of the fourth byte.

As shown in Table 2, contents of a switching request in Table 1 are arranged in decreasing order of priority.

TABLE 2

| BITS | Switching Request State | Abbreviation |
|---|---|---|
| 00001111 | Signal Fail-Protection | SF-P |
| 00001101 | Forced Switching-Ring | FS-R |
| 00001011 | Signal Fail-Ring | SF-R |
| 00001010 | Signal Degrade-Protection | SD-P |
| 00001000 | Signal Degrade-Ring | SD-R |
| 00000110 | Manual Switching-Ring | MS-R |
| 00000101 | Wait-To-Restore | WTR |
| 00000011 | Exerciser-Ring | EXER-R |
| 00000001 | Reverse Request-Ring | RR-R |
| 00000000 | No Request | NR |
| Others | Reserved for future use | |

Figure 1:
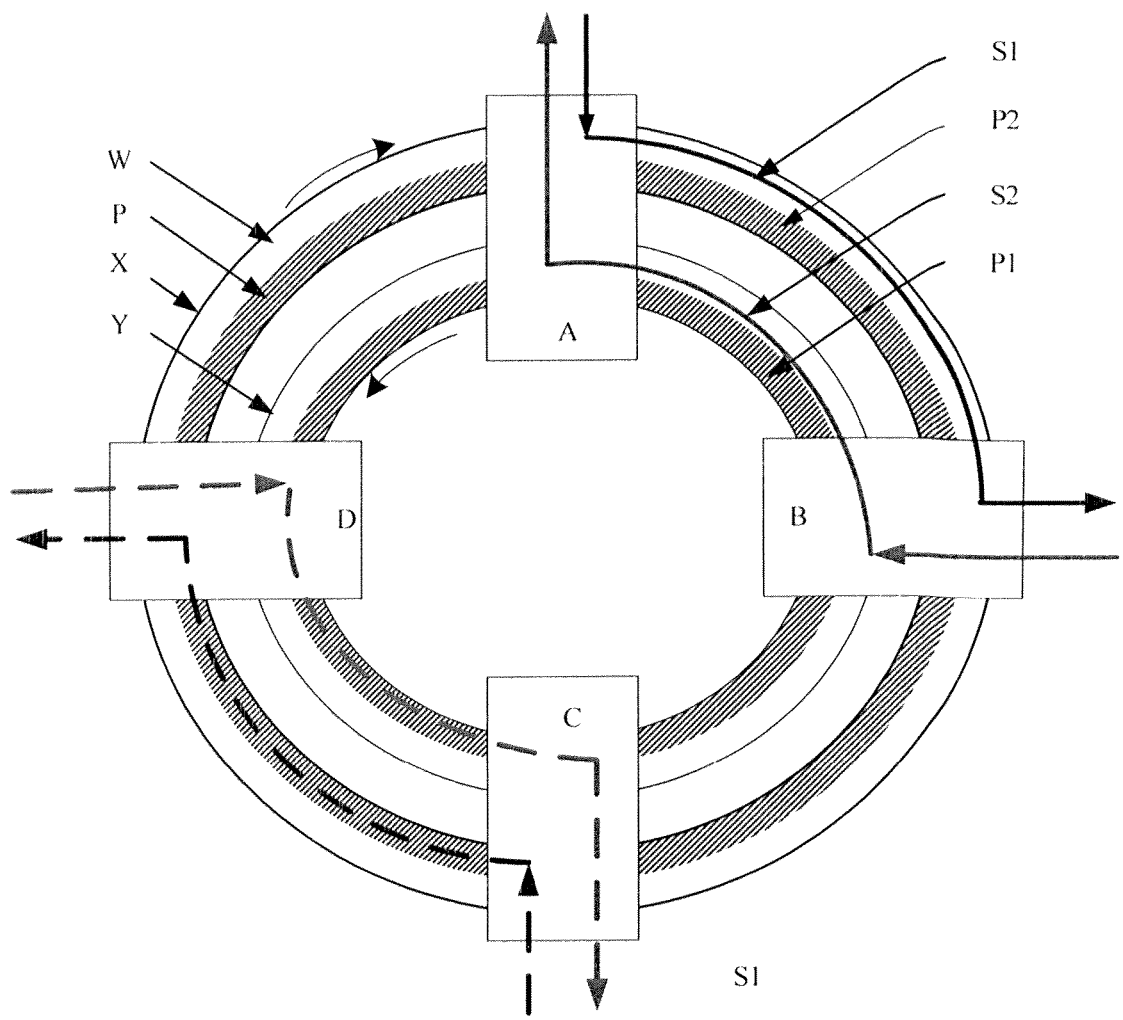
FIG. 1 is a schematic diagram illustrating the structure of two-fiber MS shared protection ring at normal working state in the WDM field.
Figure 2:
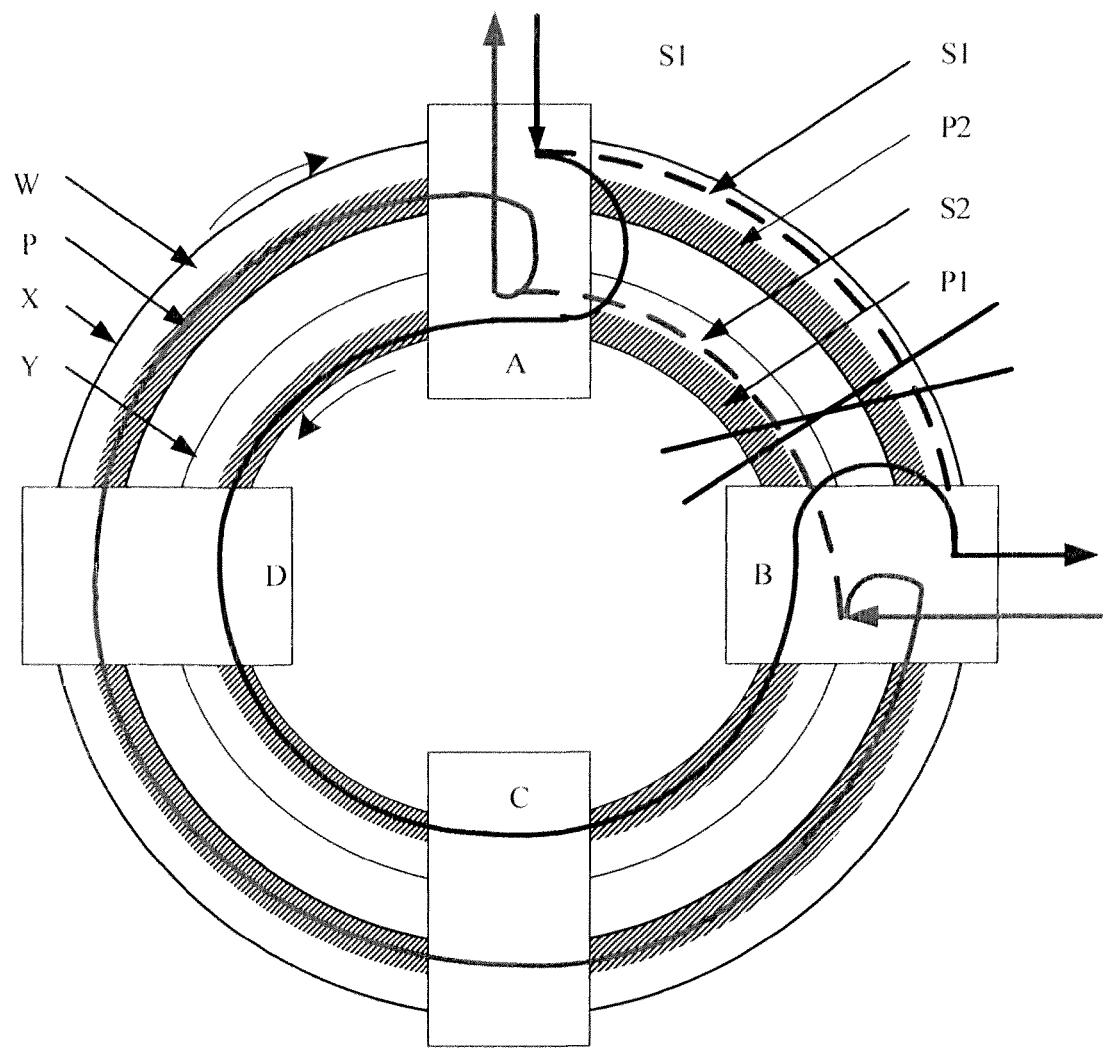
FIG. 2 is a schematic diagram illustrating the structure of two-fiber MS shared protection ring after protection switching in the WDM field.

In this embodiment, the protection switching processing is implemented according to the contents shown in FIG. 2 together with the corresponding priority order.

The meanings of the 3-bit state bits in the fourth byte are shown in Table 3.

TABLE 3

| BITS | Switching Request State | Abbreviation |
|---|---|---|
| 111 | Reserved for future use | |
| 110 | OMS Backward Defect Indicator Overhead | OMS-BDI-O |
| 101 | OMS Backward Defect Indicator Payload | OMS-BDI-P |
| 100 | Reserved for future use | |
| 011 | Extra Traffic on protection channels | |
| 010 | Bridged and Switched | Br & Sw |
| 001 | Bridged | Br |
| 000 | Idle | |

In addition, a signal label and an alarm mark may also be set in a transmitted overhead signal of the present embodiment.

The signal label has 2 bytes, the first byte indicates number of the wavelengths, which can be set as 0 for representing no wavelength, and the second byte represents the payload type. In practical applications, a label to be transmitted is filled into an overhead signal at the source node, and an expected label is set at the destination node. On receiving the overhead signal transmitted from the source node, the destination node compares whether the accepted label is in accordance with the expected label, and if these two labels are not identical, which can be regarded as an SF condition of switching, a PLM alarm will be generated and transmitted downstream. Otherwise, the PLM alarm will be cleared. If the number of the wavelengths carried in the label of the received overhead signal is 0, a PLM alarm is directly generated and transferred to downstream. In this way, when any failure takes place on the shared ring, and is detected by the two end nodes of the failure, all the nodes can detect the event through the contents carried in the signal label, and implement bridging and switching in the optical line according to the traffic relation table at every node. Thus, the normal traffic transmission in the OTN will not be affected by the failure.

The alarm mark has one byte. Here, the value of 0 set for the first bit of the alarm mark expresses no PLM alarm, and the value of I stands for having PLM alarm. The value of 0 set for the second bit expresses no FDI-O alarm, and the value of 1 stands for having FDI-O alarm. The value of 0 set for the third bit expresses no FDI-P alarm, and the value of 1 stands for having FDI-P alarm. The downstream can take the PLM alarm, the FDI-O alarm and the FDI-P alarm transferred from the upstream as SF conditions of fiber protection switching.

Figure 4:
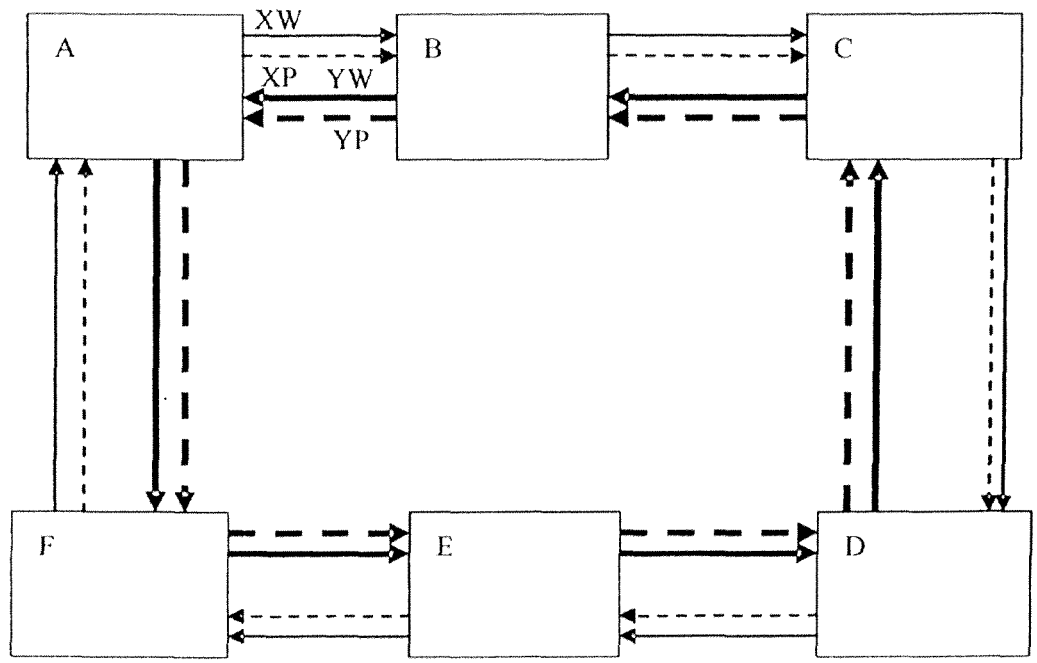
FIG. 4 is a schematic diagram illustrating the network architecture of bidirectional OMS shared protection ring in the OTN field according to an embodiment of the present invention.

The protection method of regarding the source and destination node as bridging and switching node is acceptable for ultra long-haul OMS protection ring which is employed to accomplish transoceanic applications. As shown in FIG. 4, under normal conditions, the traffic from node A to node D is transmitted though the NW by way of nodes A, B, C and D in turn, and the traffic from node D to node A is transmitted though the YW which is passing through nodes D, C, B and A in turn.

When both of the two fibers between node B and node C are broken, the traffic from node A to node D will be added to the ring at node A, bridged from the XW to the YP, and transmitted through the YP, the path of which passes through nodes A, F, E and D in turn. At node D, the traffic is dropped from the ring after being switched from the YP to the XW, or directly dropped from the ring on the YP according to practical situations.

The traffic from node D to node A is added to the ring at Node D, bridged from the YW to the XP, and transmitted through the XP, the path of which passes through nodes D, E, F and A in turn. At node A, the traffic is dropped from the ring after being switched from the XP to the YW, or directly dropped from the ring on the XP according to practical situations.

Regarding the two end nodes of the failure as bridging and switching node, when both of the two fibers between node B and node C are broken, node B is selected as bridging node for the traffic transmitted over the XW, which may bridge all the traffic transmitted over the XW to the YP. After traveling through nodes B, A, F, E, D, and C, the traffic is switched from the YP to the XW at node C. That is, node C is considered as switching node. For the traffic transmitted in the YW, node C, as bridging node, will bridge all the traffic transmitted over the YW to the XP, and after passing through nodes C, D, E, F, A, and B, the traffic is switched from the XP to the YW at node B, which is regarded as switching node.

After being processed by the ODU cross-connection unit, the input of any wavelength in any group of the four groups of wavelengths transmitted over the XW, the XP, the YW, and the YP can be outputted by performing cross-connection to any other groups.

Two groups of wavelength signals XW and XP in the same fiber share an OMS overhead XOOS. By using the OSC channel as an individual wavelength, the XW and the XP will be combined into a multi-wavelength signal, and before entering the ODU cross-connection unit, these two wavelengths are extracted and detected. Then, It will be determined whether to implement fiber protection switching in accordance with the detection result.

It could be seen from the depiction of steps 51 to 54 that the present embodiment realizes reliable and flexible traffic protection functions in the OMS shared protection ring.

Hereinafter, the execution of switching and the path of traffic signal will be described in contrast when adopting different bridging and switching nodes.

Under normal conditions, the traffic from node A to node D is transmitted through the XW, the path of which is constituted by nodes A, B, C and D in turn.

When a fiber breaking takes place on the two fibers between node B and node C:

For the instance of ultra long-haul application, bridging and switching are implemented at the source node and the destination node of the traffic, and the detailed process is: the traffic from node A to node D is added to the ring at node A, bridged and switched from the XW to the YP, and dropped from the ring through the YP. Here, the path of the traffic passes through nodes A, F, E and D in turn. At node D, the traffic is dropped from the ring after being switched from the YP to the XW.

In general, the bridging and switching are implemented at the two end nodes of the failure, and the detailed process is: the traffic from node A to node D is added to the ring at node A, then the traffic is transmitted to node B through the XW and bridged from the XW to the YP at node B. Here, the path of the traffic passes through nodes B, A, F, E, D, and C in turn. At node C, the traffic is bridged from the YP to the XW and transmitted through the XW, the path of which is constituted by node C and D in turn, and then dropped from the ring at node D.

It could be seen from the above that the present invention can realize not only small-granularity protection switching of optimal paths in ultra long-haul cases, but also simple big-granularity protection switching under normal conditions.

Also, the present embodiment can detect whether the failure is restored in a real time manner, and a WTR time can be set. When detecting that the failed optical line is recovered to normal state, timing starts. If a switching request with higher priority than WTR is received, reset the timer to stop timing;

otherwise, keep on timing, and when the preset WTR time is reached, restore the state of the node which has implemented protection switching to a normal working state. Here, the WTR time can be flexibly set according to practical situations. For example, the WTR time is between 5 minutes to 12 minutes, and the minimal step length is 1 second.

In summary the above description is just a preferable embodiment, and it is not used for limiting the present invention.

The invention claimed is:

1. A method for traffic protection in Optical Transport Network (OTN), of which nodes are connected through at least two fibers with opposite transmission directions to form a ring topology, comprising:

setting a part of channels in one fiber as working channels of an Optical Multiplex Section (OMS) shared protection ring for carrying a group of signals separately, and setting a part of channels in the other fiber with a reverse transmission direction as protection channels, the number of which is equal to that of the working channels, to form one-to-one protection for the working channels;

when a failure in an optical line of OTN is detected, determining a bridging node and a switching node in accordance with pre-designated protection strategy, bridging and switching the group of signals to be transmitted through the failed optical line between the working channels and the protection channels at the determined bridging node and switching node;

implementing OTN quality detection at each node for the optical signals passing though the node itself, respectively, and deciding whether the quality of the optical signal accords with a Signal Degrade or a Signal Fail condition, if yes, determining that a defect occurs in the optical line passed through by the optical signal, otherwise, determining that the optical line passed through by the optical signal is normal;

said Signal Degrade or Signal Fail condition is determined according to one or more indications of Signal Loss, Forward Defect Indication Payload, Forward Defect Indication Overhead, Payload Mismatch, Optical Power Low, Optical Power Difference Over, Accumulative Errors of OTU SM BIP of multiple working channels Over, and Accumulative Errors of OTU SM BIP of multiple working channels Degrade; and providing a setting interface and a query interface for optical power threshold and optical power difference threshold, where the optical power threshold and the optical power difference threshold are set and queried, respectively, through the setting interface and the query interface.

2. The method according to claim 1, wherein the bridging procedure comprises cross-connecting at the determined bridging node the group of signals from the working channels of the failed optical line to the protection channels through implementing ODUk granularity cross-connection function; and wherein the switching procedure comprises cross-connecting at the determined switching node the group of signals from the protection channels to the working channels through implementing ODUk granularity cross-connection function; or doing no processing during the switching procedure.

3. The method according to claim 2, wherein a part of the working channels and a part of the protection channels can be set for a group of wavelengths, and said cross-connecting comprises cross-connecting all ODUks contained in each of the wavelengths of the OMS shared protection ring between the working channel and the protection channel for the wavelength; or a part of the working channels and a part of the protection channels can be set for a group of ODUks, and said cross-connecting comprises cross-connecting each of the ODUks between the working channel and the protection channel for the ODUk.

4. The method according to claim 2, wherein the bridging node and the switching node are two end nodes of the failed optical line, and the switching granularity is the sum of the capacities of all working channels; or the bridging node and the switching node are the source node and the destination node of the signals, and the switching granularity is the capacity of a single working channel.

5. The method according to claim 4, wherein if the bridging node and the switching node are the source node and the destination node of the signals, the method further comprises:

when any failure is found in an optical line of the optical network, the two end nodes of the failed optical line determining the signals transmitted by the failed optical line, together with the source node and the destination node of the signals, according to a traffic relation table set in advance; and informing the source node to execute the bridging, and informing the destination node to execute the switching.

6. The method according to claim 1, wherein the method further comprises:

executing the bridging or the switching at a node which receives a protection switching command.

7. The method according to claim 6, wherein the protection switching command, and Signal degrade or Signal Fail condition can be transmitted through an overhead signal; and a portion of the Signal Degrade and Signal Fail conditions can be generated in accordance with information carried by the overhead signal, wherein the overhead signal comprises:

switching request information carried by an APS overhead signal, including Switching Request, Source Node ID, Destination Node ID, Long/Short Path ID and States;

a signal label, which is label information indicating corresponding relation between the source node and the destination node; and an alarm mark, which is content information of the generated alarm signal.

8. The method according to claim 7, wherein the method further comprises:

processing the received APS overhead signal at the node, and executing the bridging and the switching according to the information carried in the APS overhead signal and the local switching request.

9. The method according to claim 8, wherein the method further comprises:

employing a same OMS overhead signal on both working channel and protection channel in a same fiber.

10. The method according to claim 6, wherein protection switching commands, which are listed in decreasing order according to priorities, comprise:

Clear, Signal Fail-Protection, Forced Switching-Ring, Signal Fail-Ring, Signal Degrade-Protection, Signal Degrade-Ring, Manual Switching-Ring, Wait-To-Restore, Exerciser-Ring and Reverse Request-Ring.

11. The method according to claim 1, further comprising:

setting a wait-to-restore (WTR) time in advance, starting timing when the failed optical line recovers from the failure, and keeping timing in the case when no switching request with higher priority than WTR appears; and
when the WTR time set in advance is up, restoring the node which has implemented protection switching to normal working state.

12. A node apparatus in an Optical Transport Network (OTN), comprising:
- at least one wavelength-division multiplexing unit configured to output optical signals received from a line side of the OTN to an OTN line unit after de-multiplexing processing, and output optical signals received from an OTN line unit to line side of the OTN after multiplexing processing;
- at least one OTN line unit configured to transform optical signals received from the wavelength-division multiplexing unit to ODUk signals and output the ODUk signals to an ODU cross-connection unit, or transform ODUk signals received from an ODU cross-connection unit to optical signals and output the optical signals to the wavelength-division multiplexing unit;
- an ODU cross-connection unit configured to implement ODUk granularity cross-connection function;
- when bridging is needed, the ODU cross-connection unit cross-connects the ODUk signals received from working channels to corresponding protection channels, and when switching is needed, the ODU cross-connection unit cross-connects the ODUk signals received from the protection channels to corresponding working channels;
- wherein the node apparatus connects with another node apparatus through at least two fibers with opposite transmission directions to form a ring topology, a part of channels in one fiber is set as the working channels of Optical Multiplex Section (OMS) shared protection ring for carrying a group of signals separately, and a part of channels in the other fiber with a reverse transmission direction is set as the protection channels, the number of which is equal to that of the working channels, to form one-to-one protection for the working channels; and
- means for setting a wait-to-restore (WTR) time in advance, starting timing when the failed optical line recovers from the failure, and keeping timing in the case when no switching request with higher priority than WTR appears, and when the WTR time set in advance is up, restoring the node apparatus which has implemented protection switching to a normal working state.

13. The node apparatus of claim 12, further comprising means for implementing OTN quality detection for the optical signals passing through the node apparatus, respectively, and deciding whether the quality of the optical signal accords with Signal Degrade or Signal Fail condition, if yes, determining that a defect occurs in the optical line passed through by the optical signal; otherwise, determining that the optical line passed through by the optical signal is normal.

* * * * *